United States Patent
Lau et al.

(10) Patent No.: US 12,359,694 B2
(45) Date of Patent: Jul. 15, 2025

(54) TORSIONAL VIBRATION DAMPER HAVING AN AXIS OF ROTATION FOR A DRIVE TRAIN

(71) Applicant: Schaeffler Technologies AG & Co. KG, Herzogenaurach (DE)

(72) Inventors: Jennifer Lau, Achern (DE); Romain Kaufmann, Gundershoffen (FR); Uwe Weller, Karlsruhe (DE); Jean-Francois Heller, Strassburg (FR); Alain Rusch, Gambsheim (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 414 days.

(21) Appl. No.: 17/913,868

(22) PCT Filed: Mar. 3, 2021

(86) PCT No.: PCT/DE2021/100217
§ 371 (c)(1),
(2) Date: Sep. 23, 2022

(87) PCT Pub. No.: WO2021/190696
PCT Pub. Date: Sep. 30, 2021

(65) Prior Publication Data
US 2023/0115866 A1     Apr. 13, 2023

(30) Foreign Application Priority Data
Mar. 26, 2020   (DE) .................... 10 2020 108 380.7

(51) Int. Cl.
*F16D 3/12*    (2006.01)
*F16D 7/02*    (2006.01)
*F16F 15/129*  (2006.01)

(52) U.S. Cl.
CPC ............. *F16D 3/12* (2013.01); *F16D 7/027* (2013.01); *F16F 15/1297* (2013.01); *F16D 2300/22* (2013.01)

(58) Field of Classification Search
CPC ........ F16D 3/12; F16D 7/027; F16D 2300/22; F16F 15/1297
(Continued)

(56) References Cited

U.S. PATENT DOCUMENTS 7,513,176 B2 *   4/2009   Uduka .................. F16F 15/139
2005/0076739 A1   4/2005   Uduka et al.
(Continued)

FOREIGN PATENT DOCUMENTS

CN    103671701 A    3/2014
CN    105408663 A    3/2016
(Continued)

*Primary Examiner* — Greg Binda

(57) ABSTRACT

A torsional vibration damper for a drive train includes an axis of rotation, a multi-flange damper for damping torsional vibrations, a torque limiter unit for limiting a maximum transmissible torque, an outer hub connecting the multi-flange damper to the torque limiter unit for torque transmission, and an inner hub for connection to a transmission input shaft. The multi-flange damper has a plurality of flanges. The torque limiter unit is arranged radially inside the multi-flange damper and includes an inner plate and an outer plate. The outer hub is arranged radially between the multi-flange damper and the torque limiter unit and the inner hub is arranged radially inside the torque limiter unit. The outer hub includes an external toothing engaged with each of the plurality of flanges and an internal toothing engaged with the outer plate.

15 Claims, 7 Drawing Sheets

(58) Field of Classification Search
USPC .................................................. 464/46, 68.1
See application file for complete search history.

(56) References Cited

U.S. PATENT DOCUMENTS

| | | |
|---|---|---|
| 2010/0032259 A1 | 2/2010 | Saeki et al. |
| 2011/0120832 A1 | 5/2011 | Takeshita et al. |
| 2011/0195793 A1 | 8/2011 | Takeshita et al. |
| 2016/0201734 A1 | 7/2016 | Berndt |

FOREIGN PATENT DOCUMENTS

| | | |
|---|---|---|
| CN | 106687706 A | 5/2017 |
| CN | 107076258 A | 8/2017 |
| CN | 107709827 A | 2/2018 |
| CN | 109477544 A | 3/2019 |
| DE | 112010003845 T5 | 9/2012 |
| DE | 102015216356 A1 | 3/2017 |
| DE | 202019106781 U1 | 12/2019 |
| DE | 102019135036 A1 | 6/2021 |
| EP | 2317174 A2 | 5/2011 |
| JP | S60133234 U | 9/1985 |
| JP | 2005140312 A | 6/2005 |
| JP | 2008304008 A | 12/2008 |
| JP | 4941115 B2 | 5/2012 |
| JP | 2012097830 A | 5/2012 |
| JP | 2012097831 A | 5/2012 |
| JP | 2012211613 A | 11/2012 |
| JP | 5604906 B2 | 10/2014 |
| JP | 5724629 B2 | 5/2015 |
| JP | 2017155890 A | 9/2017 |
| JP | 2018528374 A | 9/2018 |
| WO | 2008019641 A1 | 2/2008 |

\* cited by examiner

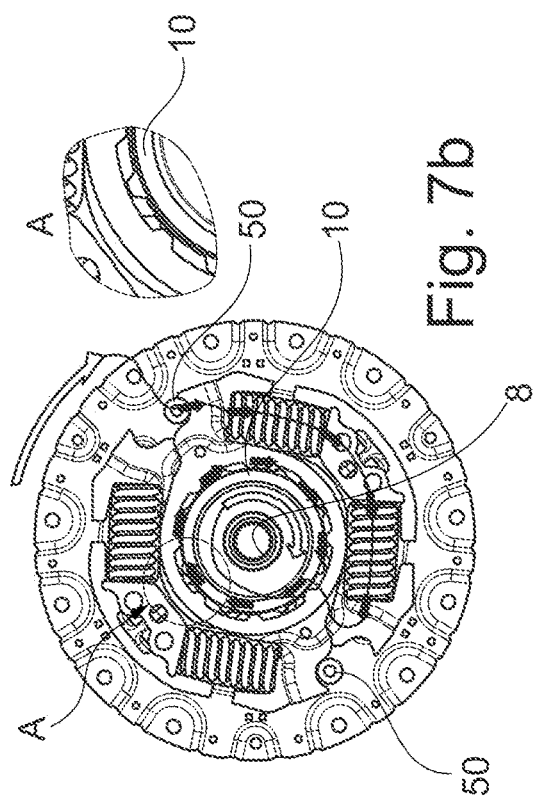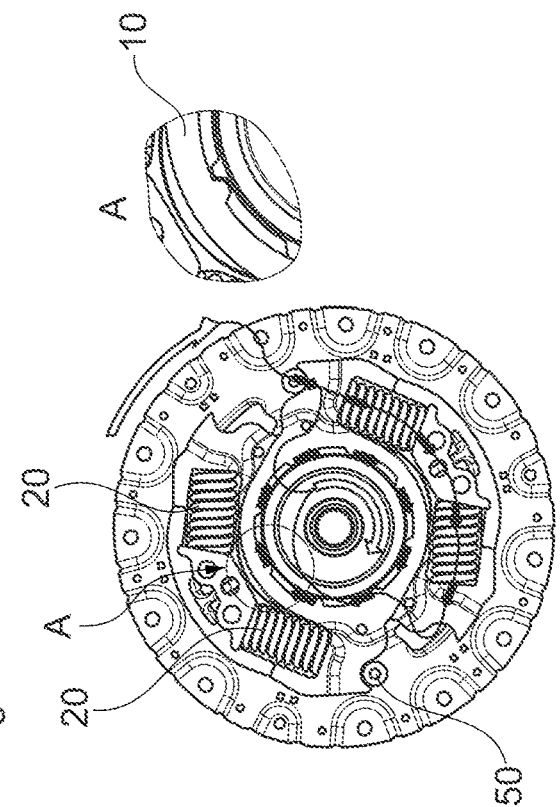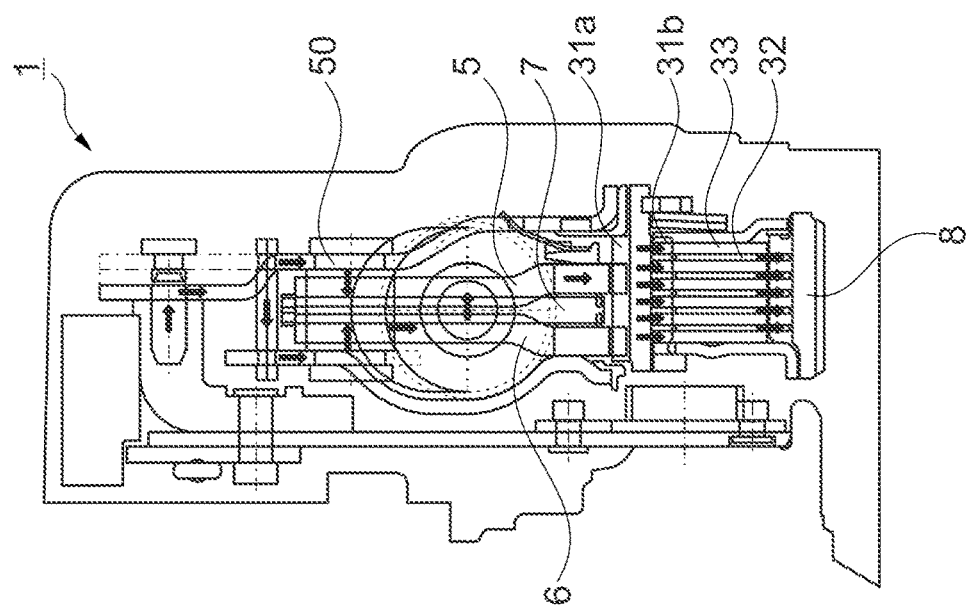

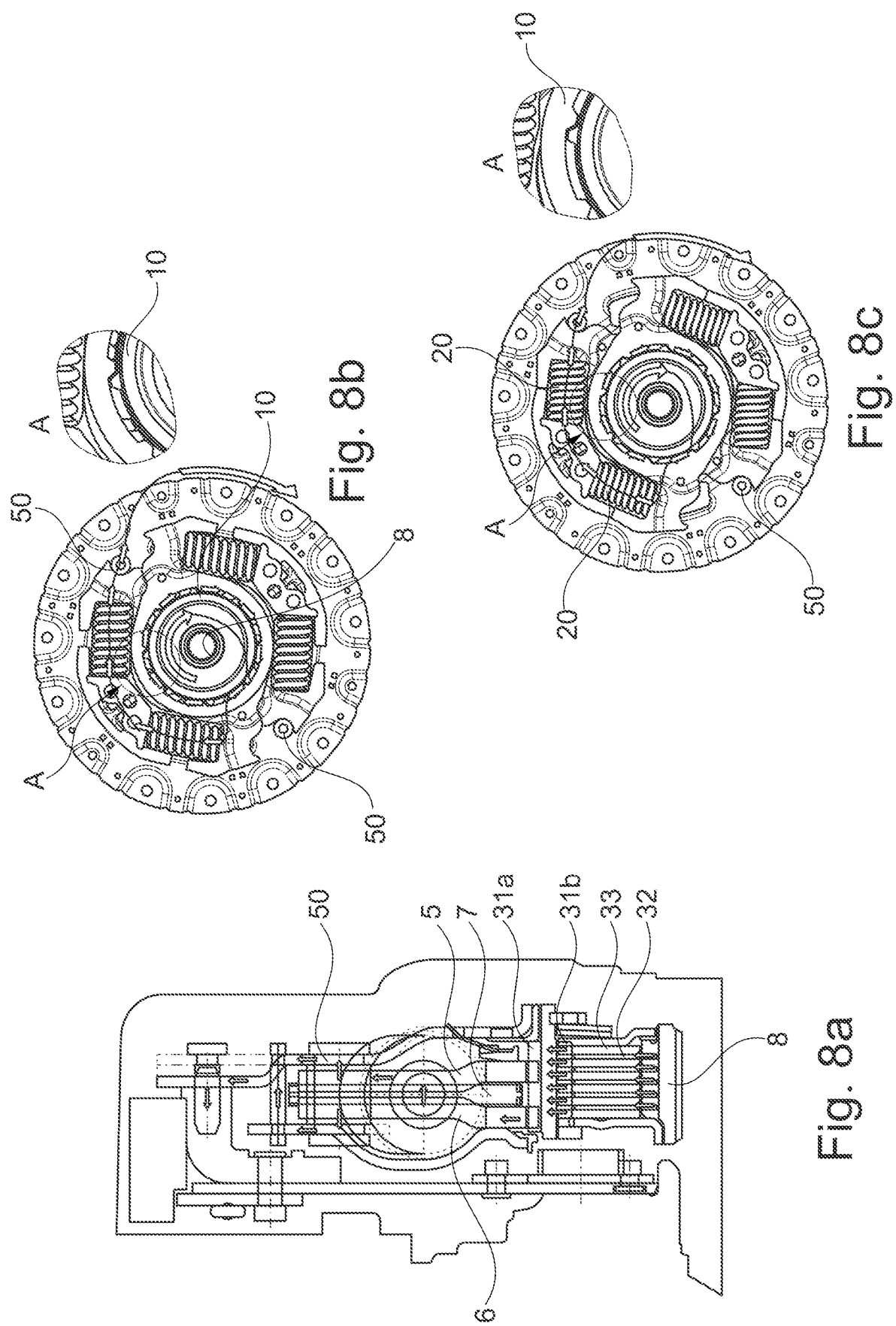

TORSIONAL VIBRATION DAMPER HAVING AN AXIS OF ROTATION FOR A DRIVE TRAIN

CROSS-REFERENCE TO RELATED APPLICATIONS

This application is the United States National Phase of PCT Appln. No. PCT/DE2021/100217 filed Mar. 3, 2021, which claims priority to German Application No. DE102020108380.7 filed Mar. 26, 2020, the entire disclosures of which are incorporated by reference herein.

TECHNICAL FIELD

The present disclosure relates to a torsional vibration damper having an axis of rotation for a drive train.

BACKGROUND

Torsional vibration dampers are known from the prior art, which torsional vibration dampers are used in a drive train, for example in a motor vehicle, in order to mitigate the effects of torque fluctuations. The drive trains of motor vehicles must also be protected against torque excess, and due to the increasing degree of electrification of the drive trains of motor vehicles, their sensitivity to such torque excess is increased. A torque limiter is integrated into the torsional vibration damper for this purpose. Furthermore, the torsional vibration damper includes a damper for torque fluctuations. In the case of torsional vibration dampers with a hub flange, there is increased wear on the helical compression springs, which first leads to a deterioration in the performance of the damper (noise) and ultimately to breakage of the helical compression spring. To reduce wear, multi-hub flanges with two or more flanges are used. This has the advantage that the pressure ends of the helical compression springs attach exclusively to the flanges and the side plates are connected via the flanges in a torque-transmitting manner, for example by means of bolts. In addition, the helical compression springs can be guided by means of the flanges.

SUMMARY

The present disclosure provides a torsional vibration damper with a reduced mass moment of inertia on the output side or on the transmission side.

According to the disclosure, a torsional vibration damper is provided with an axis of rotation for a drive train, and having at least the following components: a multi-flange damper having a plurality of flanges for damping torsional vibrations depending on the push torque and pull torque; a torque limiter unit, which is arranged radially inside the multi-flange damper and has inner plates and outer plates to limit a maximum transmissible torque; an outer hub, which is arranged radially inside the multi-flange damper and radially outside the torque limiter unit, and which connects the multi-flange damper to the torque limiter unit so as to transmit torque; and an inner hub, which is arranged radially inside the torque limiter unit for connection to a transmission input shaft. The outer hub has an external toothing which is in engagement with the flanges of the multi-flange damper in a manner that alternates depending on the push torque and pull torque, and the an internal toothing into which the outer plates of the torque limiter unit are fitted.

In the following, reference is made to the stated axis of rotation when the axial direction, radial direction or the circumferential direction and corresponding terms are used, unless explicitly stated otherwise. Unless explicitly stated otherwise, ordinal numbers used in the preceding and subsequent description are used only for the purposes of clear distinction and do not indicate an order or a ranking of designated components. An ordinal number greater than one does not necessarily mean that another such component must be present.

The torsional vibration damper proposed here is designed to mitigate torsional vibrations and torque excesses in a drive train, e.g., in an electrified drive train, and high wear resistance is achieved in a small installation space. The torsional vibration damper proposed here includes a multi-flange damper for damping torsional vibrations, which includes two or more flanges, often referred to as hub flanges. These flanges are elastically pretensioned relative to one another by means of energy storage elements; for example, helical compression springs or arc springs, so that a torque can be transmitted from one flange to the other flange solely by means of the energy storage element. In an example embodiment, three or more flanges are provided, and a first (hub) flange is arranged on the engine side and is set up directly for receiving an engine-side torque. On the opposite side, a transmission-side (hub) flange is provided, which is directly connected to a hub in a torque-transmitting manner for connection to a transmission input shaft. At least one (central) flange is provided between these two hub flanges, which is only elastically connected to the two hub flanges via at least one energy storage element on the hub flange side. The two hub flanges are not directly in torque-transmitting contact with one another.

Furthermore, a torque limiter unit is provided, which is set up to transmit a predetermined maximum torque and opens when a torque is present above the predetermined maximum torque (torque excess). This maximum transmittable torque is therefore the maximum that the other side of the torque limiter unit sees.

It is proposed here that the torque limiter unit is arranged on the transmission side, so that the multi-flange damper is not loaded with a torque above the maximum torque that can be transmitted. Thus, the multi-flange damper is protected from such a load (causing wear). The torque limiter unit is arranged here between an inner hub and an outer hub, and the inner hub is connected directly to a transmission input shaft or another intermediate element (such as a clutch or a dual-mass flywheel) to the transmission input shaft.

The outer hub is set up so that the multi-flange damper is in direct torque-transmitting contact with this outer hub. The outer hub may be designed in the direction of the multi-flange damper in such a way that the flanges of the multi-flange damper are centered on the outer hub. The torque limiter unit is provided between the outer hub and the inner hub. If, for example, the torque limiter unit is designed as a plate limiter with outer plates and inner plates, the outer plates are suspended in the outer hub and the inner plates are suspended in the inner hub. In such an embodiment of the torque limiter unit as a plate limiter, the outer plates may be designed as friction linings and the inner plates may be designed as metal (e.g., steel) plates, e.g., without friction linings.

The torque limiter unit may have a pretensioning means and a counter bearing, between which the inner plates and outer plates are arranged alternately in the axial direction in order to limit the maximum torque that can be transmitted between the inner hub and the outer hub. The pretensioning means and the counter bearing are supported axially on the outer hub.

Furthermore, the pretensioning means and the counter bearing may be arranged radially inside the outer hub.

The counter bearing maybe formed in one piece with the outer hub, and the pretensioning means may be axially supported in the outer hub by means of a securing ring. Alternatively, the counter bearing may be formed by a securing ring, and the pretensioning means may be axially supported by a one-piece inner shoulder of the outer hub.

It is proposed that the pretensioning means for the torque limiter unit and the counter bearing, which is antagonistic thereto, are each supported axially on the outer hub. For example, the pretensioning means is a cup spring (or an assembly of cup springs) and the counter bearing is a ring and the friction partners of the torque limiter unit are pressed together by the pretensioning means against the counter bearing in such a way that a maximum of a predetermined torque can be transmitted. If this predetermined torque is exceeded (torque excess), then the friction partners lift off from each other and part of the applied torque is dissipated as waste heat.

The embodiment of the torsional vibration damper proposed here has a low moment of inertia on the transmission side because the torque limiter unit is completely arranged radially inside the outer hub. If the torque limiter unit slips, only the inner hub (if necessary with the inner plates) is carried along. The pretensioning means and the counter bearing are also supported on the outer hub and are therefore not carried along.

In an example embodiment, the outer hub is designed as a machined component; for example, by turning and/or punching. Such a component is compact and can be designed with high strength and at the same time can be manufactured inexpensively. In another embodiment, the outer hub is produced by means of sintering or by means of (e.g., cold) extrusion. Other manufacturing methods can also be used, and this is to be selected according to the mechanical requirements, the number of pieces and a set budget. In one embodiment, the inner hub is manufactured in the same way as the outer hub.

In an example embodiment of the outer hub, the number of (internal) teeth of the internal toothing is greater than the number of (external) teeth of the external toothing. The number of internal teeth may correspond to a multiple of the number of external teeth. This achieves a desirable stress profile in the outer hub.

The multi-flange damper may have at least one stop with which one of the flanges can come into contact during shear torque transmission, and with same another of the flanges can come into contact during transmission of pull torque. The contact of the respective flange with the stop is free of play, while the simultaneous engagement of the respective flange with the outer hub is subject to play. The multi-flange damper is thus supported in a floating manner on the outer hub. Subject to play in the sense of a floating bearing means in this context a play in the toothing that is greater than 0.0 mm and less than 0.5 mm, which can compensate for manufacturing tolerances and also rattling noises can be prevented. If, however, there was play when the flange was placed against the stop, this would lead to rattling noises.

The torsional vibration damper proposed here corresponds, at least functionally, to the previously described torsional vibration damper, and the pretensioning means and the counter bearing of the torque limiter unit are only optionally supported in the outer hub. It is now proposed here that, alternatively or additionally to the previous description, the torsional vibration damper has an outer hub which is set up in such a way that the flanges of the multi-flange damper are mounted in a floating manner on the outer hub. By supporting in a floating manner the flanges of the multi-flange damper on the outer hub, the flanges are exempt from the forces needed to pretension the components of the torque limiter unit and are free to move according to the conditions present in a multi-flange damper and the components of the multi-flange damper are loaded accordingly (low). This is desirable if a hysteresis element (as suggested below) is provided because the hysteresis element is not subjected to forces from the torque limiter unit or the pretensioning means.

In this embodiment, both the pretensioning means and the counter bearing are supported on the outer hub and the multi-flange damper is mounted in a floating manner on the outer hub. This leads to a compact and simple construction with the mentioned benefit of the low load on the multi-flange damper.

It is further proposed in an example embodiment of the torsional vibration damper that the counter bearing is formed integrally with the outer hub and the pretensioning means is axially supported by means of a securing ring in the outer hub, or the counter bearing is formed by means of a securing ring and the pretensioning means is axially supported by means of an integral inner shoulder of the outer hub. The outer hub may be designed as a machined component, and the outer hub may have an outer shoulder with which, together with one of the flanges, a hysteresis element is formed.

In a first embodiment, it is proposed that the counter hearing is formed in one piece with the outer hub, i.e., does not need to be connected to the outer hub as a separate component, but is already formed in one piece by the outer hub during assembly of the torsional vibration damper. It is not excluded that the counter bearing is first connected to the outer hub in a pre-assembly step; for example, by welding. Furthermore, it is proposed here that the pretensioning means can be radially moved by means of a securing ring, which is designed, for example, as a spring washer that tensions radially outward and can be inserted into a corresponding groove in the outer hub.

Here is proposed in a second (alternative) embodiment that the counter bearing is formed by a securing ring, which, for example, stretches radially outward and can be inserted into a corresponding groove in the outer hub. Furthermore, an inner shoulder (directed radially inwards) is formed integrally with the outer hub, i.e., it does not need to be connected to the outer hub as a separate component, but is already formed integrally by the outer hub when the torsional vibration damper is assembled. It is not excluded that the inner shoulder is first connected to the outer hub in a pre-assembly step: for example, by means of welding. The pretensioning means is axially supported on this inner shoulder.

For example, in one embodiment of the torque limiter unit as a plate limiter (in both of the aforementioned embodiments), the plates can be inserted into the outer hub (and the inner hub) in the desired order and finally the pretensioning means or the counter bearing can be attached. The reaction force to the desired pretensioning is supported axially by means of the securing ring in the outer hub. On the inner hub there is merely a positional safeguard; for example, a floating bearing, to the torque limiter unit (possibly the inner plates). If there is torque excess, only the inner friction partner (e.g., the inner hub with the inner plates) is rotated on the transmission side, so that the transmission-side mass moment of inertia (at least in relation to the torsional vibration damper) is particularly low.

In an example embodiment, the outer hub has an outer shoulder, which is set up as an axial bearing for a hub flange of the multi-flange damper. This axial contact may be designed with a predetermined pretension and a predetermined coefficient of friction, optionally with a friction lining arranged therebetween, so that a hysteresis element is formed (see the following embodiments). In another embodiment, the external toothing of the outer hub is designed with at least one axial face, e.g., two axial faces, by means of which an axial contact is formed for the multi-flange damper, e.g., with both or one of the side disks; for example, in the embodiment described below.

It is further proposed in an example embodiment of the torsional vibration damper that a pre-damper is provided on the inner hub side and/or on the outer hub side.

It is proposed here that the torsional vibration damper further includes at least one pre-damper, for example, against a hitting noise when the coupling process is carried out quickly when idling or in a similar situation in a drive train. In one embodiment, a pre-damper is provided for each of the two torque directions (referred to as pull torque and push torque in the motor vehicle). In one embodiment, a single pre-damper is provided, which may be arranged in such a way that it is effective for both directions of torque, for example on the central flange that may be provided. In one embodiment, at least one of the pre-dampers is arranged in front of or on the inner hub, in front of or on the outer hub, or in front of or on one of the (hub) flanges.

It is also proposed in an example embodiment of the torsional vibration damper that at least three flanges are connected in series with one another.

In this embodiment, the at least three flanges are connected in series with one another, in that the flanges are supported via energy storage elements on the flange that is directly adjacent in each case in the direction of rotation (or in the direction of the angle of rotation). A rotational irregularity is thus first transmitted to a first (hub) flange, then to a (central) flange immediately adjacent in the direction of rotation, and from the (central) flange immediately adjacent in the direction of rotation in turn to the (hub) flange immediately adjacent in the direction of rotation (and continued accordingly if there are more than three flanges). Depending on the direction of the torque impact, this applies correspondingly starting from the engine side or from the transmission side or from the side of the torque limiter unit.

The hub flanges may be connected (radially inwardly) to the outer hub and (radially outwardly) to the at least one side disk in a torque-transmitting manner according to the following description, and the at least one central flange is supported solely on the hub flanges in a torque-transmitting manner, and may be centered by means of the outer hub. A staggered response of the flanges may be set up so that a softer energy storage element is arranged between the first (hub) flange and the at least one central flange and a comparatively harder energy storage element is arranged between the second (hub) flange and the at least one central flange. The energy storage elements may each be helical compression springs, for example spring assemblies with at least one inner spring and one outer spring. The helical compression springs may be all designed with straight spring axes.

It is also proposed in an example embodiment of the torsional vibration damper that at least one centrifugal pendulum is also provided, and at least one of the centrifugal pendulums may be fixed to an axially central flange of at least three flanges.

A high level of noise emission from a motor vehicle is often not desired. Thus, it is desirable to provide a centrifugal pendulum. According to the proposal, the centrifugal pendulum is connected to the torsional vibration damper here, so that predetermined vibration frequencies of the transmitted torque can be eliminated. The centrifugal pendulum may be arranged on the engine side of the (external) hub, i.e., with the multi-flange damper. This means that the moment of inertia on the transmission side is low.

In an example embodiment, the centrifugal pendulum is connected to a central flange, so that the load on the hub flanges is low and the noise-generating frequencies are eliminated early on the engine side. A further benefit is that a centrifugal pendulum is always active on the central flange during operation because the central flange is always free, i.e., actively involved in the damping, while a hub flange is firmly in contact in a corresponding torque direction. In another embodiment, a centrifugal pendulum is fixed to at least one of the hub flanges, so that a specific torque-direction-dependent extinction is set.

It is also proposed in an example embodiment of the torsional vibration damper that the multi-flange damper includes at least one helical compression spring with a straight spring axis between the plurality of flanges, and the at least one helical compression spring is radially guided only by at least one of the flanges.

It is now proposed here that the multi-flange damper has at least one helical compression spring with a straight spring axis, e.g., a total of four helical compression springs, each with a straight spring axis, two of which are arranged between a first hub flange and a central flange and two are arranged between the central flange and the other hub flange of a total of three flanges of the multi-flange damper. Such a design permits a compact construction and long torsional angles, so that large torque deflections are possible with the existing damping properties of the multi-flange damper. At the same time, helical compression springs with straight spring axes are easy to control in their damping properties and are inexpensive to manufacture.

In an example embodiment, the at least one helical compression spring is guided radially solely by at least one of the flanges, e.g., by means of a centering lug on each of the two flanges, on which the respective helical compression spring is attached. In this case, there may be no contact with other components of the multi-flange damper or the torsional vibration damper. This means that the wear on the helical compression spring is low.

In an example embodiment, the at least three flanges are connected in series with each other, e.g., by means of aforementioned helical compression springs, in that a softer helical compression spring is arranged between the first (hub) flange and the at least one central flange and a comparatively harder helical compression spring is arranged between the second (hub) flange and the at least one central flange. The helical compression springs may be at least partially designed as spring assemblies, and, in one embodiment, at least one (e.g., the inner) spring of the spring assembly is shorter than the longest spring of the spring assembly (e.g., not pretensioned, and/or at a distance from one of the adjacent flanges), so that initially only the (permanently brought into contact and braced) longest spring is in contact with the two adjacent flanges and the at least one shorter spring only becomes effective from a predetermined relative angle of rotation of the adjacent flanges. This creates a stepped spring stiffness with simple means. The outermost spring of the spring assembly may be centered, for example by means of a pin or cup, and the at least one inner spring is guided by means of the outermost spring.

In one embodiment, for example, a (single) outer helical compression spring and a (single) inner helical compression spring are provided. The outer helical compression spring is guided and centered, and the inner helical compression spring is guided by the outer helical compression spring. The inner helical compression spring is so much shorter than the outer helical compression spring that the inner helical compression spring is in contact solely with one flange or no flange, e.g., attached to one flange, for example the central flange, when the outer helical compression spring is in the uncompressed state. The inner helical compression spring is in contact with the other flange, for example one of the hub flanges, only if the two flanges are rotated through such an angle to each other that the distance covered corresponds to the difference in length of the two helical compression springs of the spring assembly described here or (then with a force transmission of the inner helical compression spring) is greater than this difference in length.

It is also proposed in an example embodiment of the torsional vibration damper that at least one side disk is provided for connection to a drive shaft, and the at least one side disk is connected to the multi-flange damper on the connection side in a torque-transmitting manner. The at least one side disk may be spaced apart from the at least one helical compression spring according to an embodiment as described above during operation of the torsional vibration damper.

In this embodiment, it is proposed that at least one side disk, e.g., two side disks as a pair, is provided axially to the side of the flanges of the multi-flange damper, and the side disk is set up, e.g., indirectly, for connection to a drive shaft. For example, the first of two paired side disks is equipped with a flange projecting radially outward, which can be connected, e.g., screwed, to a flywheel of a drive shaft. The second side disk of two side disks does not have such a radial flange and may be arranged to be axially overlapping with the connection of the first side disk to the drive shaft, for example the flywheel. The at least one side disk has a stop, e.g., the two side disks have a bolt or a rivet plate, which can be brought into torque-transmitting contact with the hub flanges in the circumferential direction.

In an example embodiment, the at least one side disk is arranged in such a way that the helical compression spring is always spaced apart from the side disk under a load according to a design, so that no frictional connection is formed between the side disk and the at least one helical compression spring. It should be pointed out that no friction-reducing means may be provided between the side disk and the helical compression spring, but rather an air gap is provided. For example, the at least one side disk is set up in such a way that an overloaded, for example broken, helical compression spring can be prevented from escaping by means of the side disk, so that surrounding components are protected in the event of a disaster.

The side disk may be a sheet metal component, which may be formed by means of cold forming, for example embossing and/or stamping.

It is further proposed in an example embodiment of the torsional vibration damper that at least one hysteresis element is formed between the at least one side disk, and one of the flanges, and, under axial hysteresis pretensioning, a first flange may be in frictional contact with a first side disk by means of a friction lining and a second flange may be in direct frictional contact with a second side disk.

Here, it is now suggested that furthermore at least one hysteresis element is formed, whereby the response behavior of the multi-flange damper can be delayed. Thus, only above a predetermined torque amplitude is a respective flange set into vibration, and below this predetermined torque amplitude the respective flange remains in its initial position. In an example embodiment, the multi-flange damper has two hub flanges, and each hub flange may be designed with a separate hysteresis element in each case, e.g., with a different configuration. A single pretensioning means may be provided for both hysteresis elements, and the pretensioning means is, for example, a cup spring (or cup spring assembly) or formed by means of an installation situation, for example by means of riveting.

In an example embodiment, a friction lining is provided between the first side disk and a first flange forming a first hysteresis element, and a direct contact is formed between the second side disk and the second flange forming a second hysteresis element. When there is direct frictional contact between the second flange and the second side disk, the coefficient of friction is low (e.g., metal to metal). This is useful in a motor vehicle for what is termed the push direction, i.e., the transmission of a (for example wheel) torque to the drive machine (see below). For the direction of pull in a motor vehicle, on the other hand, a higher coefficient of friction is desirable, and a higher torque amplitude is necessary in order to trigger the action of the multi-flange damper. Here, the use of a friction lining in the hysteresis element is beneficial.

It is further proposed in an example embodiment of the torsional vibration damper that the multi-flange damper includes three or more axially adjacent flanges and the at least one axially central flange is centered on the outer hub and axially supported by each two axially adjacent flanges, e.g., by means of a low-friction centering element.

In this embodiment, it is proposed that the multi-flange damper includes three or more flanges axially adjacent to each other, and at least one axially central flange (central flange) is formed. This axially central flange is centered on the outer hub but not in torque-transmitting contact with the outer hub. Only the two hub flanges are set up to transmit a torque (depending on the direction of rotation) with the outer hub and are also centered via the outer hub. Thus, the flanges of the multi-flange damper are all centered on the outer hub.

In an example embodiment, the at least one axially-centered flange is provided with a centering element that provides low-friction contact to the outer hub and/or to the axially-adjacent flanges. Such a centering element may be a plastic part that is clicked onto the at least one axially central flange in a form-fitting manner or is injection-molded onto it. In an example embodiment, the play between the outer hub and the centering element is small and the centering element may have running-in properties, so that deviations caused by production can be compensated for during operation.

According to a further aspect, a drive train is proposed, having at least the following components: an electric drive machine having a drive shaft; at least one consumer; and a torsional vibration damper according to an embodiment as described above. The drive shaft for torque transmission by means of the torsional vibration damper is connected to the at least one consumer in a vibration-damped and frictionally engaged manner limited to a predetermined maximum torque.

The drive train proposed here includes an electric drive machine, which is connected to the at least one consumer, for example, the drive wheels in a motor vehicle, in a torque-transmitting, e.g., separable, manner. By means of the torsional vibration damper, the electric drive machine is protected against a (consumer-side) torque excess and a torque fluctuation (at least consumer-side induced) is damped, so that the sensitive electric drive machine is well protected. The inner hub is on the consumer side and the multi-flange damper is on the engine side (for example, by means of at least one of the side disks).

The drive train proposed here is well damped against torsional vibrations and the drive machine is protected from torque excess on the transmission side. The load on the transmission components of the drive train is low due to the low mass moment of inertia on the transmission side.

According to a further aspect, a motor vehicle is proposed, having at least one drive wheel which can be driven by means of a drive train according to an embodiment as described above.

The installation space is small in motor vehicles due to the increasing number of components and it is therefore desirable to use a small-sized drive train. With the use of an electric drive machine, the sensitivity to disruptive torque fluctuations and torque excesses is high, so that effective damping of such torque fluctuations and good limitation of the maximum transmittable (wheel-side) torque is desirable.

With the torsional vibration damper proposed here, a cost-effective component that requires little installation space is proposed, which has a long service life and is designed to be gentle on the transmission due to the low mass moment of inertia on the transmission side.

BRIEF DESCRIPTION OF THE DRAWINGS

The disclosure described above is explained in detail below based on the significant technical background with reference to the associated drawings, which show example embodiments. The disclosure is in no way restricted by the purely schematic drawings, and it should be noted that the drawings are not dimensionally accurate and are not suitable for defining proportions. In the figures:

FIG. 7a shows the torsional vibration damper from FIG. 1 in section, in which the torque flow is entered in pulling operation;

FIG. 7b shows the torsional vibration damper from FIG. 1 in a plan view, in which the torque flow is entered in pulling mode at half the torsional angle;

FIG. 7c shows the torsional vibration damper from FIG. 1 in a plan view, in which the torque flow is entered in pulling mode at the full torsional angle;

FIG. 8a shows the torsional vibration damper from FIG. 1 in section, in which the torque flow is entered in overrun mode;

FIG. 8b shows the torsional vibration damper from FIG. 1 in a plan view, in which the torque flow is entered in overrun mode at half the torsional angle;

FIG. 8c shows the torsional vibration damper from FIG. 1 in a plan view, in which the torque flow is entered in overrun mode at the full torsional angle;

DETAILED DESCRIPTION

Figure 1:
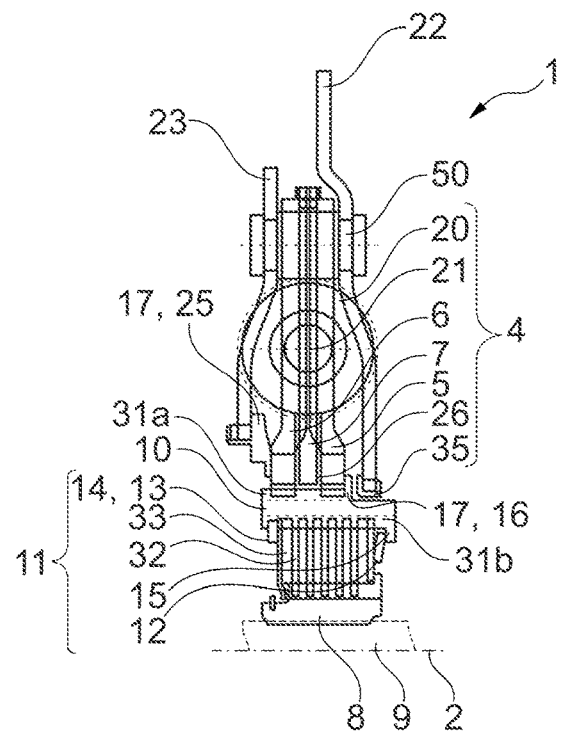
FIG. 1 shows a torsional vibration damper in section.
Figure 10:
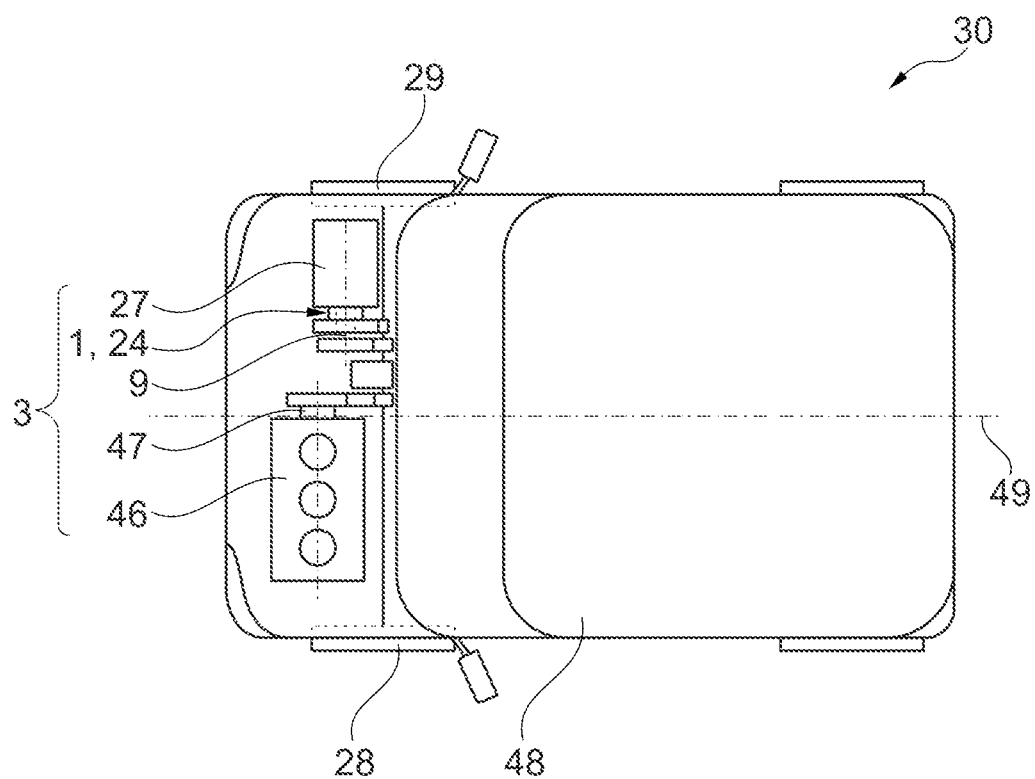
FIG. 10 shows a drive train with a torsional vibration damper in a motor vehicle.

FIG. 1 shows a schematic sketch of a torsional vibration damper 1 with an axis of rotation 2 in section on a transmission input shaft 9 (shown dashed). The torsional vibration damper 1 includes a multi-flange damper 4 and a centrally arranged torque limiter unit 11. The multi-flange damper 4 includes a helical compression spring 20 with a straight spring axis 21 and three flanges, namely a (first) hub flange 5 (shown on the right), a (second) hub flange 6 (shown on the left) and an axially central (central) flange 7. The hub flanges 5, 6 are connected to the outer toothing 31a of the outer hub 10 so as to transmit torque, depending on the direction. The central flange 7 is centered on the outer hub 10, here optionally by means of a centering element 26 and on the outer toothing 31a. The centering element 26 may be made of a friction-reducing plastic. Two side disks 22, 23 are provided on the side of the flanges 5, 6, 7 of the multi-flange damper 4 on the torsional vibration damper 1, and a first side disk 22 is set up for connection to a drive shaft 24 of a drive train 3 (ref. FIG. 10). The side disks 22, 23 here are (optionally) designed as sheet metal elements.

In order to protect the motor vehicle 30 from torque increases during operation, the torsional vibration damper 1 has a torque limiter unit 11. The torque limiter unit 11 is arranged between an inner hub 8 and an outer hub 10. The torque limiter unit 11 includes a plate assembly with a plurality of inner plates 32 and outer plates 33, one of which is designated here pars-pro-toto. The outer plates 33 are suspended in the outer hub 10 and the inner plates 32 on the inner hub 8. The outer plates 33 may be formed as friction linings 25 and the inner plates 32 may be formed as metal plates (e.g., made of steel). A pretensioning means 12 is provided for generating the predetermined pretension on the plate assembly, which is designed here as a plate spring (or as a cup spring assembly). The pretensioning means 12 and the counter bearing 13 antagonistic thereto are each (antagonistically) supported axially on the outer hub 10. The counter bearing 13 is formed here (optionally) by means of a securing ring 14 supported on the outer hub 10. The pretensioning means 12 is (optionally) supported on an inner shoulder 15 formed in one piece with the outer hub 10, wherein the inner shoulder 15 may be formed by means of pushing from a tubular blank from which the outer hub 10 is (cuttingly) formed.

Furthermore, a hysteresis element 17 is (optionally) provided on each of the two hub flanges 5, 6. A hysteresis element 17 is formed between the second hub flange 6 and the axially equilateral (second) side disk 23, wherein a friction element 34 is interposed. Another hysteresis element 17 is formed between the first hub flange 5 and an outer shoulder 16 of the outer hub 10. The first side disk 22 is centered on the outer hub 10 (optionally by means of a centering sleeve 35) and forms a contact with the outer shoulder 16.

The outer toothing 31a of the outer hub 10 alternately meshes with the flanges 5, 6, 7 of the multi-flange damper 4, depending on the push torque and the pull torque. Furthermore, the outer hub 10 has an internal toothing 31b into which the outer plates 33 of the torque limiter unit 11 are suspended. The multi-flange damper 4 has at least one stop 50 with which one of the flanges 5, 6, 7 can come into contact with transmission of push torque and with which another of the flanges 5, 6, 7 can come into contact with transmission of pull torque. The system of the respective flange 5, 6 on the stop 50 is free of play, while the simultaneous engagement of the respective flange 5, 6 with the outer hub (e.g., at a full torsional angle) is subject to play.

The inner plates 32 and the outer plates 33 are arranged alternately in the axial direction between the pretensioning means 12 and the counter hearing 13 in order to limit the maximum torque that can be transmitted between the inner hub 8 and the outer hub 10. The pretensioning means 12 and the counter bearing 13 are supported axially on the outer hub 10. Furthermore, pretensioning means 12 and the counter bearing 13 are arranged radially inside the outer hub 10. The counter bearing 13 is formed in one piece with the outer hub 10 and the pretensioning means 12 is axially supported in the outer hub 10 by means of a securing ring 14. Alternatively, the counter hearing 13 is formed by means of a securing ring 14, and the pretensioning means 12 is supported axially by means of the one-piece inner shoulder 15 of the outer hub 10.

Figure 2:
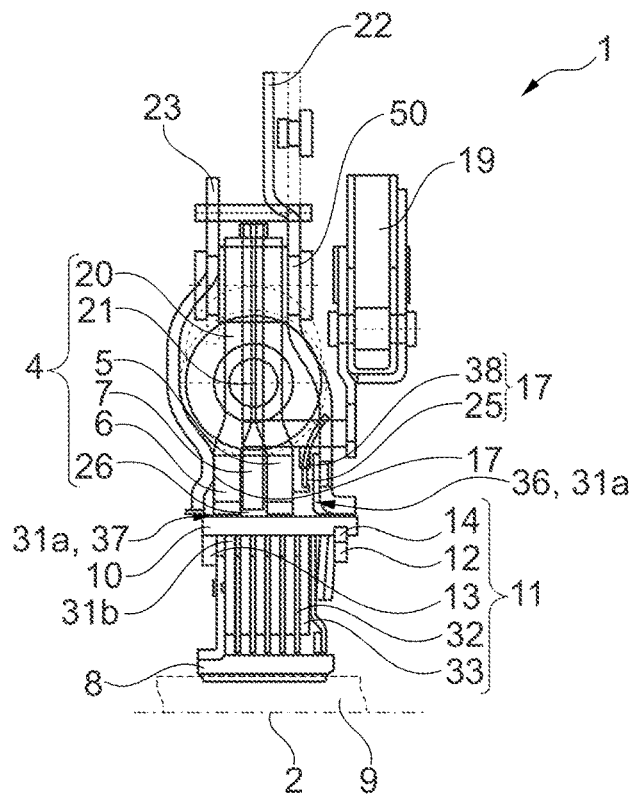
FIG. 2 shows a torsional vibration damper with a centrifugal pendulum.

FIG. 2 shows a schematic sketch of a torsional vibration damper 1 with an axis of rotation 2 in section on a transmission input shaft 9 (shown dashed). The torsional vibration damper 1 is designed in a manner similar to that described in FIG. 1 and in this respect, reference is made to the description there. The side disks 22, 23 are axially mounted here by means of the external toothing 31a of the external hub 10, namely the first side disk 22 in contact with a first axial face 36 of the external toothing 31a and the second side disk 23 in contact with a second axial face 37 of the external toothing 31a. Here, the torsional vibration damper 1 includes (regardless of the aforementioned mounting of the side disks 22, 23) a centrifugal pendulum 19, which may be suspended on the central flange 7. The centrifugal pendulum 19 is arranged axially laterally, e.g., on the transmission side, in a radial overlap with the first side disk 22 (and here also the radially smaller second side disk 23).

Two hysteresis elements 17 are provided (independently of the previously mentioned). The one hysteresis element 17 includes a hysteresis pretensioning means 38 and a friction lining 25, and the hysteresis pretensioning means 38 is designed here as a cup spring or diaphragm spring (or spring assembly) and is supported directly on the first side disk 22. The corresponding friction lining 25 is frictionally supported or secured to the first hub flange 5 (and in frictional contact with the hysteresis pretensioning means 38). The other hysteresis element 17 is formed by means of direct (metallic) contact between the second side disk 23 and the second hub flange 6. The latter hysteresis element 17 may be set up for transmission of the push torque (transmission input shaft 9 to first side disk 22) in a motor vehicle 30 because of the lower coefficient of friction, and the hysteresis element 17 with the friction lining 25 is set up for transmission of the pull torque (first side disk 22 to transmission input shaft 9) in a motor vehicle 30 because of the higher coefficient of friction (see FIG. 7). The pretensioning means 12 of the torque limiter unit 11 is supported axially (independently of the above) by means of a securing ring 14 on the outer hub 10 and the counter bearing 13 is formed in one piece with the outer hub 10.

Figure 3:
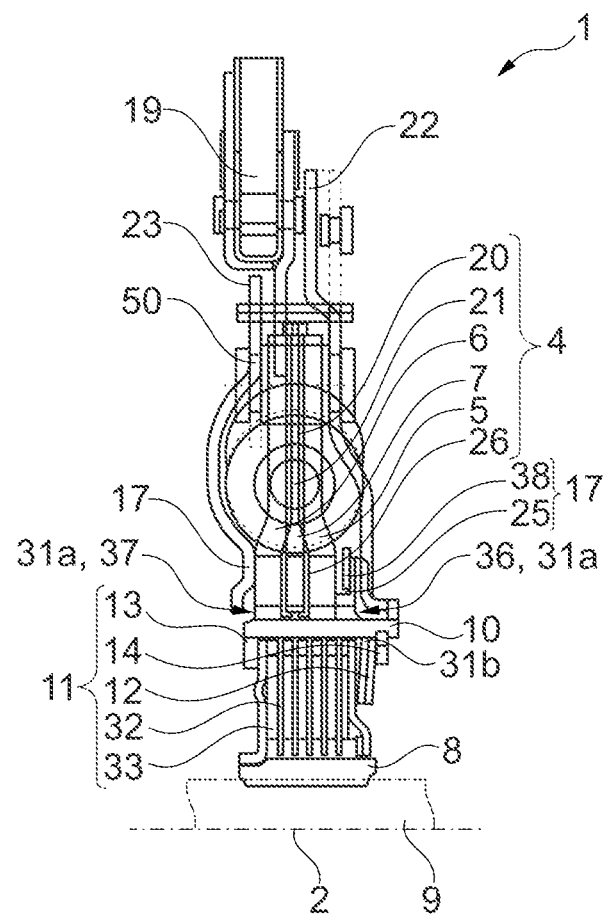
FIG. 3 shows a torsional vibration damper with a centrifugal pendulum in a further embodiment.

FIG. 3 shows a schematic sketch of a torsional vibration damper 1 with an axis of rotation 2 in section on a transmission input shaft 9 (shown dashed). The torsional vibration damper 1 is designed in a manner similar to that described in FIG. 1 and in this respect, reference is made to the description there. The torsional vibration damper 1 also includes a centrifugal pendulum 19. The centrifugal pendulum 19 is arranged radially outside the (here radially smaller) second side disk 23) and in a radial partial overlap to the side (preferably on the engine side) of the first side disk 22.

Figure 4:
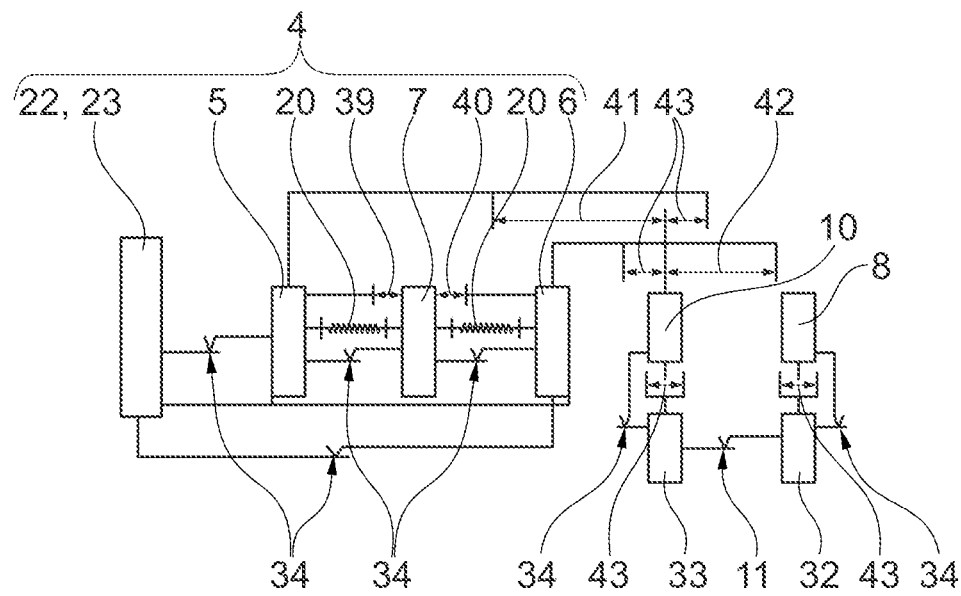
FIG. 4 shows a circuit diagram of a torsional vibration damper without a pre-damper.

FIG. 4 shows a circuit diagram of a torsional vibration damper 1 as shown in FIG. 1, for example. On the left of the image are the (engine-side) side disks 22, 23 of a multi-flange damper 4, which is connected by means of a friction element 34 to the adjacently arranged first flange 5 and the (somewhat central in the picture) second flange 6 for a desired hysteresis effect and forms the torque-transmitting stop 50 to these flanges 5, 6 on one side in each case, e.g., in the form of a spacer bolt by means of which the two side disks 22, 23 are riveted together. For example, two stops 50 are provided, which are spaced apart from one another by 180°.

A central flange 7 is arranged between the two (hub) flanges 5, 6, which are each connected to the two adjacent flanges 5, 6 by means of a helical compression spring 20 and a friction element 34 in such a way that relative rotation up to a first clearance angle 39 to the first flange 5 and up to a second clearance angle 40 to the second flange 6 is made possible elastically and with friction. The first flange 5 and the second flange 6 are each connected to the outer hub 10 in a torque-transmitting manner. A first torsional angle 41 is freely movable between the outer hub 10 and the first flange 5 in a first direction of rotation (for example push direction), i.e., freely movable in the case of excitation. Likewise, a second angle of rotation 42 can be moved freely between the outer hub 10 and the second flange 6 in a second direction of rotation (for example direction of pull), i.e., freely movable in the case of excitation. In the respective opposite direction, an (angular) play 43 is provided. The outer hub 10 is in turn connected (with play 43 and a friction element 34 or subject to friction) to the outer plates 33 and the inner hub 8 (on the transmission connection side) is connected to the inner plates 32 in a functionally same manner. The outer plates 33 and the inner plates 32 form the functional unit of the torque limiter unit 11.

Figure 5:
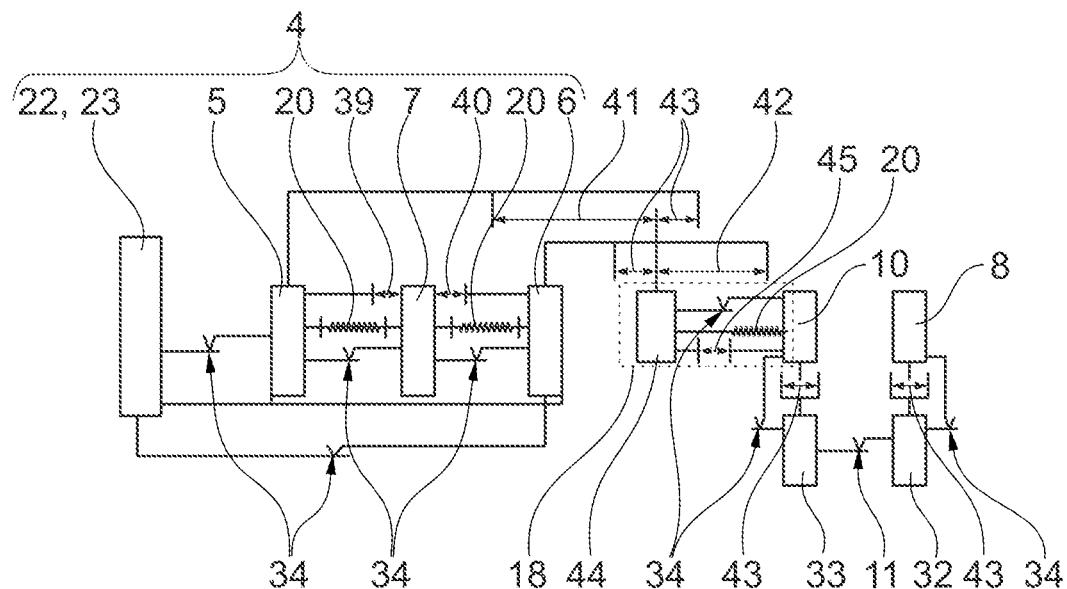
FIG. 5 shows a circuit diagram of a torsional vibration damper with a pre-damper on the outer hub side.

FIG. 5 shows a circuit diagram of a torsional vibration damper 1, as is largely shown in FIG. 4. In this respect, reference is made to the above description. In this case, however, a pre-damper 18 is additionally provided, which is connected between the outer hub 10 and the (hub) flanges 5, 6 of the multi-flange damper 4. The pre-damper output 44 forms the direct connection to the (hub) flanges 5, 6 and the outer hub 10 is connected to the multi-flange damper 4 only indirectly via the pre-damper 18 in a torque-transmitting manner. Similarly to the multi-flange damper 4, the pre-damper 18 includes an energy storage element; for example, a helical compression spring 20, and a friction element 34, as well as a (third) clearance angle 45 about which the outer hub 10 and the pre-damper output 44 can be rotated relative to each other. However, the damping properties are designed differently; for example, softer and with a larger dissipation component.

Figure 6:
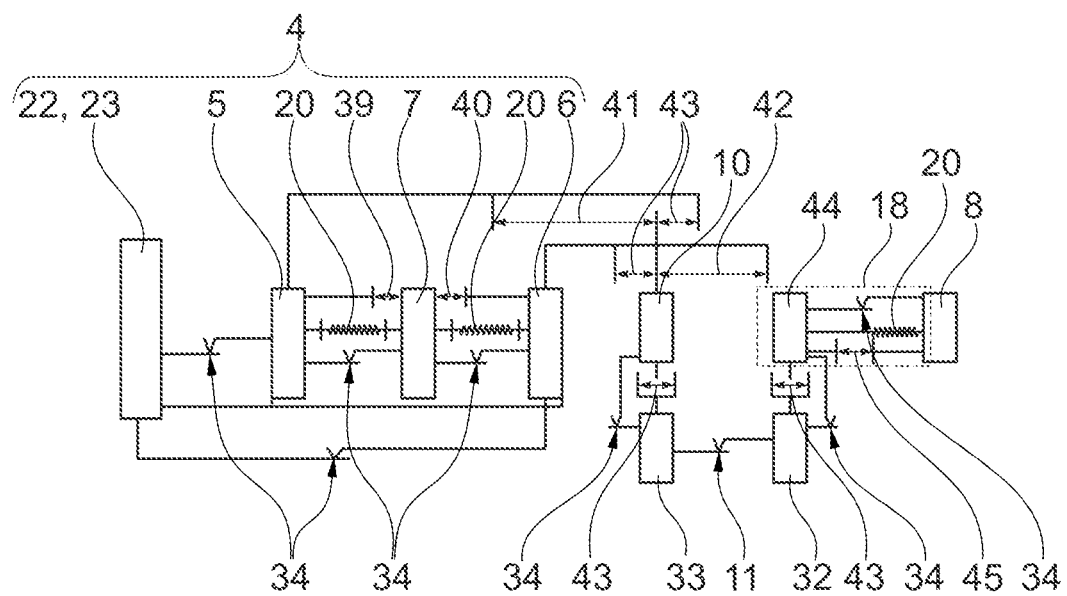
FIG. 6 shows a circuit diagram of a torsional vibration damper with a pre-damper on the inner hub side.

FIG. 6 shows a circuit diagram of a torsional vibration damper 1, as is largely shown in FIG. 5. In this respect, reference is made to the above description. In this case, however, a pre-damper 18 is provided, which is connected between the inner hub 8 and the inner plates 32. The pre-damper output 44 forms the direct connection to the inner plates 32 and the inner hub 8 is connected to the torque limiter unit 11 only indirectly via the pre-damper 18 in a torque-transmitting manner. The pre-damper 18 is set up, for example, as described in FIG. 5.

In FIGS. 7a to 7c, the torsional vibration damper 1 from FIG. 1 is shown in section and in a plan view. The torque flow is entered in pull mode, in FIG. 7b at half the torsional angle and in FIG. 7c at full torsional angle. The two stops 50 are formed by spacer bolts against which both flanges 5, 6 rest in the nominal position (not tensioned). The torque is introduced clockwise via the two side disks 22, 23 (partly removed or cut free in the plan views). The spacer bolts are firmly connected to the side disks 22, 23, so that the torque is transmitted from the spacer bolts to the first flange 5. The second flange 6 transmits the torque to the applied helical compression spring 20. This is compressed and guides the torque to the central flange 7.

The central flange 7 transmits the torque to the next helical compression spring 20. In the process, the central flange 7 is twisted by about half the twisting angle that the second flange 6 makes. This structure thus forms a series connection of the two aforementioned compression springs 20. This compression spring 20 transmits torque to the first flange 5, which moves relative to the side disks 22, 23. The first flange 5 rests against the external toothing 31a after a play 43 that is greater than 0.0 mm and less than 0.5 mm has been overcome. The torque is then introduced into the torque limiter unit 11. The torque is distributed in such a way that the first flange 5 resting on the torque limiter unit 11 transmits more torque than the second flange 6. As soon as the torque has reached a limit value, both flanges 5, 6 have their teeth on the external toothing 31a of the torque limiter unit 11, and two of the three flanges 5, 6, 7 transmit torque. In this direction of rotation, the external toothing 31a of the torque limiter unit 11 acts as a torque limiter.

In FIGS. 8a to 8c, the torsional vibration damper 1 from FIG. 1 is shown in section and in a plan view. The torque flow is entered in push mode, in FIG. 8b at half the torsional angle and in FIG. 8c at full torsional angle. In the opposite direction, the torque comes from the inner hub 8 via the torque limiter unit 11 to the outer toothing 31a. Here, too, the play 43 between the external toothing 31a and the teeth of the flanges 5, 6 must first be overcome. In this direction of rotation there is a relative movement of the second flange 6 to the two side disks 22, 23. The relative movement generates additional friction with the hysteresis element 17 on the side disks 22, 23. In this direction of rotation, the external toothing 31a of the torque limiter unit 11 acts as a torque transmitter.

Figure 9:
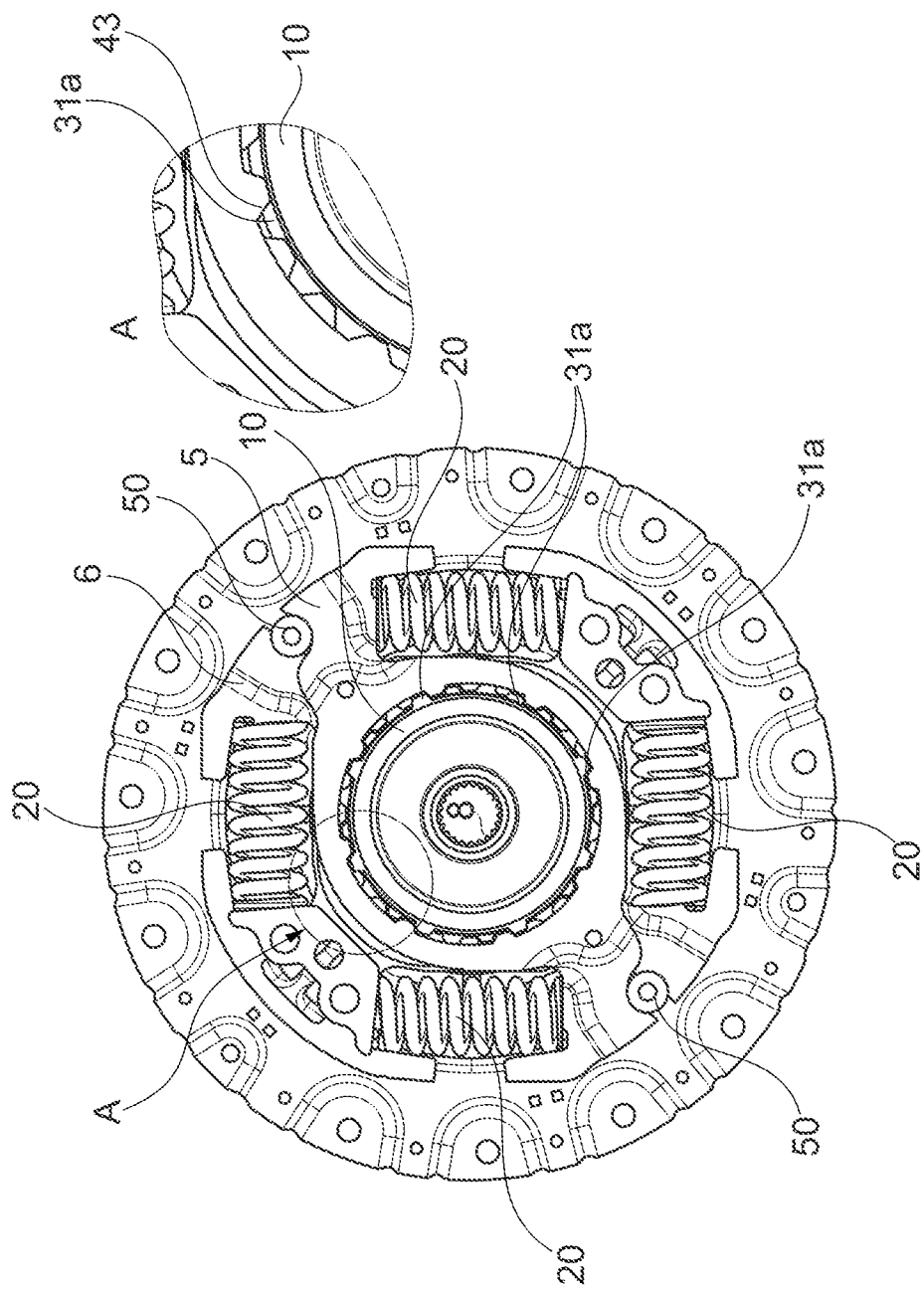
FIG. 9 shows the torsional vibration damper from FIG. 1 in a plan view.

In FIG. 9 the play 43 between a tooth of the first flange 5 and the external toothing 31a is shown again in detail. The same applies to the second flange 6 on the other side of the torsional vibration damper 1.

FIG. 10 shows a (hybrid) drive train 3 in a (hybrid) motor vehicle 30. An electric drive machine 27 is connected in parallel via its drive shaft 24 (rotor shaft) and an internal combustion engine 46 is connected via its internal combustion shaft 47 in a torque-transmitting manner to the left drive wheel 28 and right drive wheel 29 that form the consumer. The motor vehicle 30 is designed as a front-wheel drive vehicle, which is purely optional, so that the electric drive machine 27 and the internal combustion engine 46 are arranged in front of the driver's cab 48. In addition, the electric drive machine 27 and the internal combustion engine 46 are, purely optionally, in a transverse arrangement, i.e., with the rotor shaft 24 and internal combustion engine shaft 47 arranged transversely to the longitudinal axis 49 of the motor vehicle 30.

The preceding exemplary embodiments relate to a torsional vibration damper 1 having an axis of rotation 2 for a drive train 3, having at least the following components: a multi-flange damper 4 having a plurality of flanges 5, 6, 7 for damping torsional vibrations depending on the push torque and pull torque; a torque limiter unit 11, which is arranged radially inside the multi-flange damper 4 and has inner plates 32 and outer plates 33 to limit a maximum transmissible torque; an outer hub 10, which is arranged radially inside the multi-flange damper 4 and radially outside the torque limiter unit 11, and which connects the multi-flange damper 4 to the torque limiter unit 11 so as to transmit torque; and an inner hub 8, which is arranged radially inside the torque limiter unit 11 for connection to a transmission input shaft 9. The outer hub 10 has an external toothing 31a which is in engagement with the flanges 5, 6, 7 of the multi-flange damper 4 in a manner that alternates depending on the push torque and pull torque, and the outer hub 10 has an internal toothing 31b into which the outer plates 33 of the torque limiter unit 11 are fitted.

With the torsional vibration damper proposed here, a mass moment of inertia on the output side or on the transmission side is low.

REFERENCE NUMERALS

1 Torsional vibration damper
2 Axis of rotation
3 (Hybrid) drive train
4 Multi-flange damper
5 First flange
6 Second flange
7 Central flange
8 Inner hub
9 Transmission input shaft
10 Outer hub
11 Torque limiter unit
12 Pretensioning means
13 Counter bearing
14 Securing ring
15 Inner shoulder of the outer hub
16 Outer shoulder of the outer hub
17 Hysteresis element
18 Pre-damper
19 Centrifugal pendulum
20 Helical compression spring
21 Spring axis
22 First side disk
23 Second side disk
24 Drive shaft
25 Friction lining
26 Centering element
27 Electric drive machine
28 Left drive wheel
29 Right drive wheel
30 (Hybrid) motor vehicle
31a External toothing
31b Internal toothing
32 Inner plate
33 Outer plate 34 Friction element
35 Centering sleeve
36 First axial face
37 Second axial face
38 Hysteresis pretensioning means
39 First clearance angle
40 Second clearance angle
41 First torsional angle
42 Second torsional angle
43 Play
44 Pre-damper output
45 Third clearance angle (pre-damper)
46 Internal combustion engine
47 Internal combustion engine shaft
48 Driver's cab
49 Longitudinal axis
50 Stop

The invention claimed is:

1. A torsional vibration damper comprising:
an axis of rotation for a drive train;
a multi-flange damper comprising a plurality of flanges for damping torsional vibrations;
a torque limiter unit arranged radially inside the multi-flange damper and comprising inner plates and outer plates to limit a maximum transmissible torque;
an outer hub arranged radially inside the multi-flange damper and radially outside the torque limiter unit, the outer hub connecting the multi-flange damper to the torque limiter unit so as to transmit torque; and
an inner hub arranged radially inside the torque limiter unit for connection to a transmission input shaft, wherein the outer hub comprises
an external toothing engaged with the plurality of flanges in a manner that alternates depending on a push torque and a pull torque; and
an internal toothing into which the outer plates of the torque limiter unit are fitted.

2. The torsional vibration damper of claim 1, wherein:
the torque limiter unit comprises a biasing means and a counter bearing, between which the inner plates and outer plates are arranged alternately in the axial direction for limiting the maximum torque that can be transmitted between the inner hub and the outer hub, and
the biasing means and the counter bearing are supported axially on the outer hub.

3. The torsional vibration damper of claim 2, wherein the biasing means and the counter bearing are arranged radially inside the outer hub.

4. The torsional vibration damper of claim 2, wherein the counter bearing is formed in one piece with the outer hub and the biasing means is supported axially in the outer hub by a securing ring; or
wherein the counter bearing is formed by means of a securing ring and the biasing means is supported axially by a one-piece inner shoulder of the outer hub.

5. The torsional vibration damper of claim 1, wherein:
the multi-flange damper comprises a stop;
one of the plurality of flanges can contact the stop during push torque transmission;
another of the plurality of flanges can contact the stop during transmission of pull torque; and
the contact of the respective flange with the stop is free of play, while the simultaneous engagement of the respective flange with the outer hub is subject to play.

6. The torsional vibration damper of claim 1, wherein the plurality of flanges comprises three flanges connected in series with one another.

7. The torsional vibration damper of claim 6, further comprising a centrifugal pendulum fixed to an axially central flange of the three flanges.

8. The torsional vibration damper of claim 1, wherein:
the multi-flange damper comprises a helical compression spring with a straight spring axis between the plurality of flanges; and
the helical compression spring is radially guided by one of the plurality of flanges.

9. The torsional vibration damper of claim 8, further comprising a first side disk for connection to a drive shaft, wherein:
the first side disk is connected on a connection side to the multi-flange damper in a torque-transmitting manner; and
the first side disk is spaced apart from the helical compression spring during operation of the torsional vibration damper.

10. The torsional vibration damper of claim 9, further comprising:
a hysteresis element formed between the first side disk and one of the plurality of flanges; and
a second side disk, wherein, under axial hysteresis biasing, a first flange of the plurality of flanges is in frictional contact with the first side disk by means of a friction lining and a second flange of the plurality of flanges is in direct frictional contact with the second side disk.

11. The torsional vibration damper of claim 1 further comprising a low-friction centering element, wherein:
the plurality of flanges comprises three axially adjacent flanges; and
an axially central flange of the three axially adjacent flanges is centered on the outer hub and axially supported by the other two of the three axially adjacent flanges by the low-friction centering element.

12. A torsional vibration damper for a drive train, comprising:
an axis of rotation;
a multi-flange damper for damping torsional vibrations, the multi-flange damper comprising a plurality of flanges;
a torque limiter unit for limiting a maximum transmissible torque, the torque limiter unit arranged radially inside the multi-flange damper and comprising:
an inner plate; and
an outer plate;
an outer hub connecting the multi-flange damper to the torque limiter unit for torque transmission, the outer hub arranged radially between the multi-flange damper and the torque limiter unit; and
an inner hub for connection to a transmission input shaft, the inner hub arranged radially inside the torque limiter unit and comprising:
an external toothing engaged with each of the plurality of flanges; and
an internal toothing engaged with the outer plate.

13. The torsional vibration damper of claim 12, wherein:
the torque limiter unit further comprises:
a biasing means; and
a counter bearing, wherein:
the inner plate and the outer plate are arranged axially between the biasing means and the counter bearing; and the biasing means and the counter bearing are arranged radially inside of and axially supported on the outer hub.

14. The torsional vibration damper of claim 13 wherein:

the torque limiter unit further comprises a securing ring; and the counter bearing is formed in one piece with the outer hub and the securing ring axially supports the biasing means in the outer hub; or the counter bearing is formed by the securing ring, the outer hub comprises a one-piece inner shoulder, and the biasing means is axially supported by the inner shoulder.

15. The torsional vibration damper of claim 14, wherein:

the multi-flange damper comprises a stop;

the plurality of flanges comprises a first flange and a second flange connected in series;

the first flange contacts the stop during transmission of push torque transmission;

the second flange contacts the stop during transmission of pull torque;

the contact between the first flange or the second flange with the stop is free of play; and simultaneous engagement of the first flange or the second flange with the outer hub has play.

* * * * *